United States Patent [19]

Hauser et al.

[11] Patent Number: 5,294,677
[45] Date of Patent: Mar. 15, 1994

[54] HOUSEWARES

[75] Inventors: Deborah I. Hauser, Lowell, Mass.; Michael B. Colella, Plantsville, Conn.; William G. Blasius, Jr., Charlton, Mass.

[73] Assignee: Novacor Chemicals (International) S.A., Fribourg, Switzerland

[21] Appl. No.: 758,802

[22] Filed: Sep. 12, 1991

[51] Int. Cl.$^5$ ............................................. C08F 265/06
[52] U.S. Cl. ..................................... 525/308; 525/89; 525/93
[58] Field of Search ......................... 525/93, 89, 308

[56] References Cited

U.S. PATENT DOCUMENTS

| | | | |
|---|---|---|---|
| 3,906,057 | 9/1975 | Durst | 525/89 |
| 3,906,058 | 9/1975 | Durst | 260/876 |
| 3,907,931 | 9/1975 | Durst | 260/876 |

FOREIGN PATENT DOCUMENTS

| | | | |
|---|---|---|---|
| 56-070043 | 6/1981 | Japan | 525/89 |
| 56-100840 | 8/1981 | Japan | 525/93 |
| 57-021443 | 2/1982 | Japan | 525/89 |
| 61-043643 | 3/1986 | Japan | 525/93 |
| 62-091518 | 4/1987 | Japan | 525/93 |
| 63-072747 | 4/1988 | Japan | 525/89 |

OTHER PUBLICATIONS

Plastics Manuf., vol. 95, 1981 p. 39.
Chemical Abstracts No. 109:171278v, I. Yamaoka et al "Synergistic Impact Properties of Styrene 'Butadiene . . . .".
Chemical Abstracts No. 106:85901z, T. Honma et al "Thermoplastic Compositions".
Chemical Abstracts No. 112:8285y, Y. Toyama et al, "Block Copolymers".
Chemical Abstracts No. 99:196070j, "Improvement of Anisotropy in Block Copolymer".
Chemical Abstracts No. 111:8522c, I. Yamaoka et al "Injection Molding of High-Impact Styrene Polymer Compositions".

*Primary Examiner*—Paul R. Michl
*Assistant Examiner*—Edward Cain
*Attorney, Agent, or Firm*—Stevens, Davis, Miller & Mosher

[57] ABSTRACT

Many cleaners, are extremely hard on many plastic products causing environmental stress cracking. Small household articles made from a polymer alloy of a clear brittle styrenic acrylate, a rubbery block styrene-diene copolymer, and a ductile styrene-diene polymer when exposed to such cleaners have significantly less environmental stress cracking.

31 Claims, No Drawings

HOUSEWARES

FIELD OF THE INVENTION

The present invention relates to small household articles having an improved environmental stress crack resistance to cleaners, including the so-called "green" or "environmentally friendly" cleaners based upon sodium bicarbonate. The household articles may be made from a polymer alloy which has improved environmental stress crack resistance to such cleaners. Typically such articles include articles such as a hair brush, a tooth brush, a soap tray, a dental floss applicator, soap dishes, toothbrush holders, shower caddies, towel racks, kitchen utensil racks or containers, food containers, crisper lids, small utensils and parts therefore such as blender containers, containers and fixture handles such as faucet handles.

BACKGROUND OF THE INVENTION

Many plastic articles suffer from poor environmental stress crack resistance. Typically on exposure to cleaners or oily or fatty materials the plastic suffers a significant loss in physical properties and may spontaneously develop cracks. "Environmentally friendly" is a term which is gaining wide use in industry and advertising. Generally it connotes a product having a good compatibility with the environment. Unfortunately "environmentally friendly" is much like beauty. It is in the eye of the beholder or a matter of perspective. While sodium carbonate based cleaners are environmentally friendly in the sense that they do not rely on organic solvents of strong bases or acids they have one drawback. They tend to be very hard on plastics and particularly on copolymers or alloys containing polymers of vinyl aromatic monomers and alkyl methacrylates.

In concurrent research Novacor Chemicals Inc. developed a polymer alloy which has outstanding toughness. There was nothing in the initial program which indicated that the alloy had any improved chemical properties such as environmental stress crack resistance to cleaners including those based on sodium bicarbonate. Applicants have discovered this unique property of the polymer.

The above noted polymer is the subject matter of U.S. patent application Ser. No. 654,058 filed Feb. 12, 1991.

The following is a list of references which applicants feel may be relevant to the composition of the new polymer alloy of the present invention.

Chemical Abstracts 109:171278v [*Polym. Prepr. (Am. Chem. Soc., Div. Polym. Chem.*) 1988, 29(2), 180–1] discloses that physical blends of block SBR (styrene content: 75.2 weight percent) and a copolymer of methyl methacrylate and styrene are partially compatible. The morphological and mechanical properties of the blend are strongly dependent on the molding/mixing process used to produce the blend. The SBR could only be toughened when the ideal morphology of the blend was obtained.

Chemical Abstracts 106:85901z [JP 61/200,151] discloses thermoplastic compositions comprising from 5 to 95 weight percent of a block copolymer and from 95 to 5 weight percent of a thermoplastic polymer (e.g. ABS). The block copolymer is derived from coupling an aromatic vinyl polymer block with an aromatic vinyl monomer-conjugated diene copolymer block. The subject thermoplastic compositions apparently have improved impact strength.

Chemical Abstracts 112:8285y [JP 61/291,610] discloses the use of "impact modifiers" for thermoplastic polymers. The modifiers are basically similar to the block copolymer disclosed by Chemical Abstracts 106:85901z.

Chemical Abstracts 99:196070j [JP 58/122,954] discloses improvement of anisotropy of a styrene hydrocarbon-conjugated diene block copolymer by blending it with a styrene-methacrylic ester copolymer. Such a blend, when extruded to form a molded plate, apparently possesses superior physical properties.

Chemical Abstracts 111:8522c [JP 01/45614] discloses high-impact styrene polymer compositions comprises a major amount of a styrene (50 to 90 weight percent)-conjugated diene (50 to 10 weight percent) block copolymer and a minor amount of a styrene-based polymer (e.g. styrene-methyl methacrylate copolymer).

The above art all discusses the physical or mechanical properties of similar alloys. However, none of the art suggests that such alloys could have any improved chemical properties.

It would be desirable to have a composition which possesses a combination of improved properties, including improved impact strength. Typically the alloys of the present invention should have a notched Izod impact strength of greater than about 0.5, preferably greater than 1.0 ft.lb./in. In a particularly preferred aspect of the present invention, the alloys may have a haze of less than 10, most preferably less than 5. It is also desirable to have such polymers which retain at least 80, more preferably 85% of their flexural, tensile, and Izod impact properties after exposure for 1 hour to a sodium bicarbonate based cleaner or a 75% solution of sodium bicarbonate. Most preferably the composition will not show visible stress cracks (small cracks) on exposure to sodium bicarbonate based cleaners or a 75% solution of sodium bicarbonate. Polymers or polymer alloys having the above properties are referred to in this specification as having good environmental stress crack resistance (ESCR).

SUMMARY OF THE INVENTION

The present invention provides a small household article having good environmental stress crack resistance to cleaners said article comprising: from 80 to 100% of a polymer alloy consisting essentially of:

(i) from 30 to 82 weight percent of a brittle polymer;

(ii) from 3 to 50 weight percent of a rubbery polymer; and (iii) from 15 to 67 weight percent of a ductile polymer provided that the ductile polymer and the rubbery polymer are at least compatible; and the balance one or more conventional pigments, dyes, fillers or fibres.

DETAILED DESCRIPTION

As used in this specification:

"brittle" means a polymer having an elongation at break up to 15%, preferably less than 10%, as measured by ASTM D-638;

"ductile" means a polymer having an elongation at break greater that 15%, as measured by ASTM D-638;

"rubbery" means a natural or synthetic polymer which, at room temperature can be stretched to at least twice its original length, and upon immediate release of the stress, will return to approximate original length;

"compatible" means two or more polymers which have good interfacial adhesion (for example, a blend of the polymers exhibits physical properties approximate those expected from the rule of mixtures);

"miscible" means two or more polymers which, when blended, remains clear, especially if the refractive indices of the polymers do not match;

"household articles" means small, usually personal, hand held articles or devices including a hair brush, a tooth brush, a soap tray, a dental floss applicator, soap dishes, toothbrush holders, shower caddies, towel racks, kitchen utensil racks or holders, a food containers or small removable parts from larger appliance such as crisper tray lids, and food processor parts such as the clear containers and blender containers; applicators for "steam cleaners"; and fixture handles such as faucet handles; and the like; and "good environmental stress crack resistance" is as defined above.

The household articles of the present invention comprise a major amount, typically from 80 to 100% of a polymer alloy and a minor amount of other materials such as dyes, fillers, flame retardants antioxidants and fillers and fibres. The fibres may be to impart stiffness to the product or they may have a different function as in the bristles on a brushes.

Typically the polymer alloys used in accordance with the present invention will have mechanical properties within the following ranges:

(a) Haze - less than 10%;
(b) Izod Impact (ft.lb./in.) - 0.4 or greater;
(c) Tensile Yield (psi) - greater than 3000;
(d) Flexural Modulus (kpsi) - greater than 200 (e.g. 200,000 psi); and
(e) Tensile Elongation - of greater than 20%.

Additionally, the alloys have a very high transparency greater than about 85% preferably greater than 90%.

The brittle polymer used in the present polymer alloy may be selected from the group of polymers consisting of polymers comprising:

(i) from 90 to 30, preferably from 80 to 40, most preferably from 75 to 55, weight percent of one or more $C_{8-12}$ vinyl aromatic monomers which are unsubstituted or substituted by a $C_{1-4}$ alkyl radical;

(ii) from 10 to 70, preferably from 20 to 60, most preferably from 25 to 45, weight percent of one or more $C_{1-6}$ alkyl esters of $C_{3-6}$ ethylenically unsaturated carboxylic acids; and (iii) from 0 to 5, preferably from 0 to 3, weight percent of one or more $C_{3-6}$ ethylenically unsaturated carboxylic acids.

The $C_{8-12}$ vinyl aromatic monomer suitable for use in the polymer components of the present polymer alloys is not particularly restricted and may be unsubstituted or substituted by a $C_{1-4}$ alkyl radical. Preferably, the $C_{8-12}$ vinyl aromatic monomer is selected from the group comprising styrene, α-methyl styrene, p-methyl styrene and t-butyl styrene. The preferred $C_8$–$C_{12}$ vinyl aromatic monomer is styrene.

The choice of $C_{1-4}$ alkyl ester of a $C_{3-6}$ ethyenically unsaturated carboxylic acid for use in producing the brittle polymer is not particularly restricted. Non-limiting examples of suitable esters include methyl acrylate, ethyl acrylate, methyl methacrylate, ethyl methacrylate, butyl acrylate and butyl methacrylate. The preferred ester is methyl methacrylate.

A brittle styrene acrylate polymer suitable for use in the present polymer alloys is a copolymer of styrene and methyl methacrylate. Preferably, such a copolymer comprises from 75 to 65 weight percent styrene and from 25 to 35 weight percent methyl methacrylate. Such a polymer is commercially available from Polysar Inc. under the trademark NAS 30.

The production of a brittle polymer suitable for use in the present polymer alloys is within the purview of a person skilled in the art. Such polymers may be produced by suspension, solution, emulsion or bulk polymerization.

Preferably the brittle polymer is used in an amount from 35 to 75; most preferably from 40 to 70 weight percent of the alloy.

The ductile polymer used in the present polymer alloys may be derived from 60 to 90, preferably from 70 to 80, weight percent of at least one $C_{8-12}$ vinyl aromatic monomer, and 40 to 10, preferably from 30 to 20, weight percent of at least one $C_{4-6}$ conjugated diolefin.

A ductile polymer suitable for use in the present polymer alloys is a linear or radial di-block (vinyl aromatic monomer-conjugated diene) or tri-block (vinyl aromatic monomer-conjugated diene-vinyl aromatic monomer) copolymer. The production of such copolymers is known to those skilled in the art. Such polymers can be produced by living solution polymerization (e.g. using a lithium catalyst).

A rubbery polymer suitable for use in the present polymer alloy is derived from 30 to 70, preferably from 40 to 55, weight percent of at least one $C_{8-12}$ vinyl aromatic monomer, and 70 to 30, preferably from 60 to 55, weight percent of at least $C_{4-6}$ conjugated diolefin.

A rubbery polymer suitable for use in the present polymer alloy may be a linear, tapered or radial di-block (aromatic vinyl monomer-conjugated diene) or tri-block copolymer (vinyl aromatic monomer-conjugated diene-vinyl aromatic monomer). As is known in the art, a tapered di-block copolymer is a copolymer comprising a block which becomes progressively rich in one of the constituent monomers in a segment (typically, the end) of the block.

The process by which such a tapered copolymer is obtained is similar to the process by which block copolymers are obtained except that there is an incremental adjustment in the monomer feed (e.g. richer or poorer in vinyl aromatic/conjugate diolefin) to produce a block polymer which is "tapered".

Suitable $C_{8-12}$ vinyl aromatic monomers for use in the ductile polymer and the rubbery polymers of the present invention are not particularly restricted and may be unsubstituted or substituted by a $C_{1-4}$ alkyl radical. Preferably, the $C_{8-12}$ vinyl aromatic monomer is selected from the group comprising styrene, α-methyl styrene, p-methyl styrene and t-butyl styrene. A preferred $C_{8-12}$ vinyl aromatic monomer is styrene. Generally, the ductile polymer will contain a larger amount of vinyl aromatic monomer, typically in the range from 70 to 80 weight percent; and the rubbery polymer will contain lower amounts of vinyl aromatic monomer, typically in the range 40 to 50 weight percent.

The $C_{4-6}$ conjugated diolefin suitable for use in the ductile polymer and the rubbery polymer of the present polymer alloys is not particularly restricted and may be unsubstituted or substituted by a chlorine atom. Preferably, the $C_{4-6}$ conjugated diolefin is selected from the group comprising 1,3-butadiene and isoprene.

The rubbery and ductile polymers suitable for use in the present invention should at least be compatible. Preferably, the polymers will be miscible (as defined in the present application).

The polymer alloys of the present invention may comprise from 3 to 50, preferably from 5 to 30, weight percent of the rubbery polymer; from 27 to 67, preferably from 25 to 65 weight percent of the ductile polymer. The brittle polymer may be present in an amount from 30 to 70 weight percent. It should be kept in mind that the ductile and rubbery polymers are at least compatible. At relatively low amounts of brittle polymer, from 30 to 55, preferably from 30 to 45, weight percent, the brittle polymer may form a discontinuous phase distributed within the matrix of rubbery and ductile polymer. At relatively higher amounts of brittle polymer, from 45 to 90, preferably from 55 to 90, weight percent, the ductile and rubbery polymer may form a discontinuous phase distributed throughout the brittle matrix. In the range of from 45 to 55 weight percent of the brittle polymer, the continuous phase is not merely determined by the relative amount of brittle polymer but will also depend on the difference in melt viscosities between the brittle phase and the rubbery and ductile phases.

The rubbery and ductile phases are at least compatible. That is, these components of the alloy will have good interfacial adhesion. Under stress they will not delaminate. Preferably, the rubbery and ductile components are miscible. That is, when blended they will form a clear component, whether or not their refractive indices are matched or close.

For the present invention, in the polymer alloy the refractive index of the brittle polymer is matched to the refractive index of the blend of the ductile and rubbery polymers. If the refractive indices of the brittle polymer and a blend of the ductile and rubbery polymers match to within ±0.01, the alloy will have a low haze, preferably less than 10. If the refractive indices of the brittle polymer and a blend of the rubbery and ductile polymers matches to within ±0.005, then the alloys will have extremely low haze.

In view of the above, the refractive index of the brittle polymer may be selected to try to minimize haze. By blending the ductile and rubbery components in the desired, or required, ratio, the refractive index of the resulting material may be measured if the rubbery and ductile polymers are miscible. Then, the composition of the brittle polymer may be estimated using the formula set forth in the Polymer Handbook, 2nd Ed. John Wiley and Sons Inc. and the refractive indices of the monomers. In this manner, it may be possible to match indices of refraction and obtain extremely clear and tough alloys.

The above is not intended to place any limitation on the order of mixing the polymers. It is not necessary to have a specific sequenced addition of polymers to the alloy.

In the preparing the polymer alloys used in the present invention, solution blending of the constituents is generally not useful as it is difficult to find a common solvent for each polymer in the blend. Typically, adequate mixing of the components can be achieved by mechanical mixing in a suitable intensive mixer, preferably an extruder. Operation of an extruder to achieve this end is within the purview of a person skilled in the art. For example, for an inch and a half extruder having an L to D ratio of about 24:1, the extruder is operated at from 30 to 150, preferably from 50 to 135, most preferably from 75 to 100, RPM. During such operation, the barrel temperature of the extruder is in the range of from 190° to 240° C., preferably from 200° to 220° C.

In one aspect of preparing the alloys which may be used in the present invention, the ductile and rubbery polymers may be extruded and chopped into pellets. The resulting pellets may then be extruded with the brittle polymer. However, the components of the alloys of the present invention may also be dry blended in, for example, a tumble blender. The resulting blend may then be extruded. In an alternative procedure, the polymers may be fed directly to an extruder which provides good mixing.

Embodiments of the invention will be illustrated with reference to the following Examples which should not be construed so as to limit the scope of the present invention.

Samples

Commercially available samples of alloys of brittle polymer, ductile polymer, and rubbery polymer available from Novacor Chemicals Inc. under the trademark ZYLAR having the grade designations:

(a) ST 94-568;
(b) ST 94-560;
(c) ST 94-561; and
(d) ST 94-562 were molded into test pieces and the test pieces were tested.

The ZYLAR alloys come within the composition ranges specified in the specification. The components used in the blends are as follows.

COMPONENT

Brittle polymer - A copolymer derived from styrene (70 weight percent) and methyl methacrylate (30 weight percent), available from Polysar Inc. as NAS 30 (trademark).

Ductile polymer - A linear tri-block copolymer derived from styrene (75 weight percent) and butadiene (25 weight percent).

Rubbery polymer - A tapered polymer derived from styrene (43 weight percent) and butadiene (57 weight percent).

The samples of the ZYLAR ST alloys were injection molded into a number of suitable test specimens for conducting the physical tests.

For comparison purposes a PETG (sold under the trademark KODAR PETG 6763, a polycarbonate (sold under the trademark LEXAN 141), and EKTAR DA003 MB, (believed to be a melt blend of polycarbonate and PCTG polyester) were also molded into test specimens.

EXAMPLE 1

The specimens of the above samples were exposed, at an imposed strain of 0.9%, to Dental Care (trademark) baking soda tooth paste for one hour. The samples were then observed for visible environmental stress cracks and then tested for tensile strength and tensile elongation (both ASTM D 638). The tensile strength and tensile elongation of the specimens exposed to the tooth paste were compared to those for specimens not exposed to the tooth paste. The percent of retained properties for the specimens was then calculated and recorded. The results of the test are set forth in Table 1.

TABLE 1

| Sample | % Retained Tensile Strength | Tensile Elongation | Visible Stress Cracks |
|---|---|---|---|
| ZYLAR ST 94-568 | 100.4 | 121.5 | No |
| ZYLAR ST 94-560 | 100.3 | 108.2 | No |
| ZYLAR ST 94-561 | 100.1 | 101.4 | No |
| ZYLAR ST 94-562 | 99.4 | 96.8 | No |
| PETG | 88.3 | 8.1 | Yes |
| POLYCARBONATE | 86.2 | 34.8 | Yes |
| EKTAR DA003 MB | 93.6 | 38.6 | Yes |

The above data shows the improved environmental stress crack resistances of the polymers alloys used in the present invention over the alloys which may be used in similar applications.

EXAMPLE 2

Example 1 was repeated but the toothpaste was CREST (trademark)-regular flavour. ZYLAR ST 94-568, 561 and 562 were not tested. The PETG specimen was not tested as this polymer is commonly used in these types of applications and does not show a significant loss of properties on exposure to "normal" tooth paste. The results are set forth in Table 2.

TABLE 2

| Sample | % Retained Tensile Strength | Tensile Elongation | Visible Stress Cracks |
|---|---|---|---|
| ZYLAR ST 94-568 | 1001.9 | 105.9 | No |
| POLYCARBONATE | 86.2 | 30.1 | No |
| EKTAR DA003 MB | 94.0 | 38.4 | No |

The data shows that the alloys of the present invention are quite resistant to chemical degradation upon exposure to "normal" toothpaste.

EXAMPLE 3

Example 2 was repeated except that PETG and ZYLAR were not tested and the tooth paste was replaced with a 75% aqueous solution of baking soda. The results are set forth in Table 3.

TABLE 3

| Sample | % Retained Tensile Strength | Tensile Elongation | Visible Stress Cracks |
|---|---|---|---|
| PETG | 103.5 | 85.9 | |
| POLYCARBONATE | 95.2 | 89.1 | |
| EKTAR DA003 MB | 97.3 | 95.0 | No |

EXAMPLE 4

Example 3 was repeated except the time of exposure was changed to 24 hours and the PETG specimens were not tested but ZYLAR ST 94-560 was tested. The results are set forth in Table 4.

TABLE 4

| Sample | % Retained Tensile Strength | Tensile Elongation | Visible Stress Cracks |
|---|---|---|---|
| ZYLAR ST94-560 | 102.9 | 93.0 | No |
| POLYCARBONATE | 97.4 | 91.2 | No |
| EKTAR DA003 MB | 98.4 | 98.3 | No |

This data shows that the alloys of the present invention have good retention of properties on exposure for 24 hours to 75% aqueous baking soda.

EXAMPLE 5

Specimens of ZYLAR ST 94-560 and EKTAR DA003 MB were exposed for one hour to DOW (trademark) Bathroom Cleaner with Scrubbing Bubbles (trademark). The samples were tested as described above. The results are set forth in Table 5.

TABLE 5

| Sample | % Retained Tensile Strength | Tensile Elongation | Visible Stress Cracks |
|---|---|---|---|
| ZYLAR ST 94-560 | 101.9 | 101.8 | No |
| EKTAR DA003 MB | 60.7 | 2.0 | Yes |

What is claimed is:

1. A small household article having good environmental stress crack resistance to cleaners said article comprising:
   from 80 to 100% of a polymer alloy consisting essentially of:
   (i) from 30 to 82 weight % of a brittle polymer comprising:
      (a) from 80 to 40 weight percent of one or more $C_{8-12}$ vinyl aromatic monomers which are unsubstituted or substituted by a $C_{1-4}$ alkyl radical;
      (b) from 20 to 60 weight percent of one or more $C_{1-6}$ alkyl esters of $C_{3-6}$ ethylenically unsaturated carboxylic acids; and
      (c) from 0 to 5 weight percent of one or more $C_{3-6}$ ethylenically unsaturated carboxylic acids;
   (ii) from 3 to 50 weight % of a rubbery polymer comprising:
      (a) from 40 to 45 weight percent of one or more $C_{8-12}$ vinyl aromatic monomers; and
      (b) from 60 to 55 weight percent of one or more $C_{4-6}$ conjugated diolefins; and
   (iii) from 15 to 67 weight percent of a ductile polymer comprising:
      (a) from 70 to 80 weight percent of one or more $C_{8-12}$ vinyl aromatic monomers; and
      (b) from 30 to 20 weight percent of one or more $C_{4-6}$ conjugated diolefins.

2. The article according to claim 1, wherein in said polymer alloy said ductile and said rubbery polymers are miscible.

3. The article according to claim 2, wherein in said brittle polymer in said polymer alloy said $C_{1-6}$ alkyl ester of a $C_{3-6}$ ethylenically unsaturated carboxylic acid is selected from the group consisting of methyl methacrylate, ethyl methacrylate, methyl acrylate, ethyl acrylate, butyl acrylate and butyl methacrylate; said $C_{8-12}$ vinyl aromatic monomer is selected from the group consisting of styrene, α-methyl styrene, p-methyl styrene, and t-butyl styrene.

4. The article according to claim 3, wherein in said polymer alloy said brittle polymer is present in an amount from 75 to 35 weight percent.

5. The article according to claim 4, wherein in said polymer alloy said ductile polymer is selected from the group consisting of linear or radial di- or tri-block copolymers of one or more $C_{8-12}$ vinyl aromatic monomers which are unsubstituted or substituted by a $C_{1-4}$ alkyl radical and one or more $C_{4-6}$ conjugated diolefin monomers.

6. The article according to claim 5, wherein in said ductile polymer in said polymer alloy said $C_{8-12}$ vinyl aromatic monomer is selected from the group consisting of styrene, α-methyl styrene, p-methyl styrene, and t-butyl styrene, and said conjugated diolefin is selected from the group consisting of butadiene and isoprene.

7. The article according to claim 6, wherein in said polymer alloy said ductile polymer is present in an amount from 65 to 25 weight percent.

8. The article according to claim 7, wherein in said polymer alloy said rubbery polymer is selected from the group of polymers consisting of tapered, linear and radial di- and tri-block copolymers comprising block polymers of one or more $C_{8-12}$ vinyl aromatic monomers which are unsubstituted or substituted by a $C_{1-4}$ alkyl radical and block polymers of one or more $C_{4-6}$ conjugated diolefin monomers.

9. The article according to claim 8 wherein in said rubbery polymer in said polymer alloy said one or more $C_{8-12}$ vinyl aromatic monomers is selected from the group consisting of styrene, α-methyl styrene, p-methyl styrene, and t-butyl styrene, and said one or more $C_{4-6}$ conjugated diolefin monomers is selected form the group consisting of butadiene and isoprene.

10. The article according to claim 9, wherein in said polymer alloy said rubbery polymer is present in an amount from 5 to 30 weight percent.

11. The article according to claim 10, wherein in said polymer alloy said brittle polymer forms a continuous phase and said ductile and said rubbery polymers form one or more discontinuous phases.

12. The article according to claim 11, wherein in said polymer alloy said brittle polymer is present in an amount from 45 to 82 weight percent.

13. The article according to claim 12, wherein in said polymer alloy said brittle polymer is present in an amount from 55 to 82 weight %.

14. The article according to claim 13, wherein in said polymer alloy wherein said brittle polymer is present in an amount from 55 to 82 weight percent and comprises:
(i) from 55 to 75 weight percent of said one or more $C_{8-12}$ vinyl aromatic monomers;
(ii) from 45 to 25 weight percent of said one or more $C_{1-4}$ alkyl acrylates or $C_{1-4}$ alkyl methacrylates; and
(iii) from 0 to 3 weight percent of said one or more $C_{3-6}$ ethylenically unsaturated carboxylic acids.

15. The article according to claim 14, wherein in said polymer alloy said brittle polymer is present in an amount from 55 to 82 weight percent and comprises:
(i) from 75 to 65 weight percent of styrene;
(ii) from 25 to 35 weight percent of methyl methacrylate; and
(iii) from 0 to 3 weight percent of one or more $C_{3-6}$ ethylenically unsaturated carboxylic acids.

16. The article according to claim 13, wherein in said polymer alloy the index of refraction of said brittle polymer matches the index of refraction of a blend of said ductile and said rubbery polymers within ±0.01.

17. The article according to claim 14, wherein in said polymer alloy the index of refraction of said brittle polymer matches the index of refraction of a blend of said ductile and said rubbery polymers within ±0.01.

18. The article according to claim 9, wherein in said polymer alloy said ductile and rubbery polymers form a continuous phase and said brittle polymer forms a discontinuous phase.

19. The article according to claim 18, wherein in said polymer alloy said brittle polymer is present in an amount from 30 to 55 weight percent.

20. The article according to claim 19, wherein in said polymer alloy said brittle polymer is present in an mount from 30 to 45 weight percent and comprises:
(i) from 55 to 75 weight percent of said one or more $C_{8-12}$ vinyl aromatic monomers;
(ii) from 45 to 25 weight percent of said one or more $C_{1-4}$ alkyl acrylates or $C_{1-4}$ alkyl methacrylates; and
(iii) from 0 to 3 weight percent of said one or more $C_{3-6}$ ethylenically unsaturated carboxylic acids.

21. The article according to claim 19, wherein in said polymer alloy said brittle polymer is present in an amount from 30 to 45 weight percent and comprises:
(i) from 75 to 65 weight percent of styrene;
(ii) from 25 to 35 weight percent of methyl methacrylate; and
(iii) from 0 to 3 weight percent of one or more $C_{3-6}$ ethylenically unsaturated carboxylic acids.

22. The article according to claim 21, wherein in said polymer alloy the index of refraction of said brittle polymer matches the index of refraction of a blend of said ductile and said rubbery polymers within ±0.01.

23. The article according to claim 20, wherein in said polymer alloy the index of refraction of said brittle polymer matches the index of refraction of a blend of said ductile and said rubbery polymers within ±0.01.

24. The article according to claim 21, wherein in said polymer alloy the index of refraction of said brittle polymer matches the index of refraction of a blend of said ductile and said rubbery polymers within ±0.01.

25. The household article according to claim 1, which is selected from the group consisting of a hair brush, a tooth brush, a soap tray, a dental floss applicator, a food container, a crisper lid, a food processor container, a blender container, and a faucet handle.

26. The household article according to claim 10, which is selected from the group consisting of a hair brush, a tooth brush, a soap tray, a dental floss applicator, a food container, a crisper lid, a food processor container, a blender container, and a faucet handle.

27. The household article according to claim 11, which is selected from the group consisting of a hair brush, a tooth brush, a soap tray, a dental floss applicator, a food container, a crisper lid, a food processor container, a blender container, and a faucet handle.

28. The household article according to claim 14, which is selected from the group consisting of a hair brush, a tooth brush, a soap tray, a dental floss applicator, a food container, a crisper lid, a food processor container, a blender container, and a faucet handle.

29. The household article according to claim 21, which is selected from the group consisting of a hair brush, a tooth brush, a soap tray, a dental floss applicator, a food container, a crisper lid, a food processor container, a blender container, and a faucet handle.

30. The article according to claim 13, wherein in said polymer alloy the index of refraction of said brittle polymer matches the index of refraction of a blend of said ductile and said rubbery polymers within ±0.01.

31. The article according to claim 19 wherein in said polymer alloy said brittle polymer is present in an amount from 30 to 45 weight %.

* * * * *